Oct. 25, 1932.    W. O. WITHERSPOON ET AL    1,884,948
APPARATUS FOR MOLDING MATERIALS
Filed July 21, 1930    6 Sheets-Sheet 3

INVENTORS
WILLIAM O. WITHERSPOON
JAMES HARROWER
BY Charles S. Evans
THEIR ATTORNEY Oct. 25, 1932.  W. O. WITHERSPOON ET AL  1,884,948
APPARATUS FOR MOLDING MATERIALS
Filed July 21, 1930   6 Sheets-Sheet 4

INVENTORS
WILLIAM O. WITHERSPOON
JAMES HARROWER
BY Charles S. Evans
THEIR ATTORNEY Oct. 25, 1932.  W. O. WITHERSPOON ET AL  1,884,948
APPARATUS FOR MOLDING MATERIALS
Filed July 21, 1930   6 Sheets-Sheet 5

INVENTORS
WILLIAM O. WITHERSPOON
JAMES HARROWER
BY Charles S. Evans
THEIR ATTORNEY Oct. 25, 1932.  W. O. WITHERSPOON ET AL  1,884,948
APPARATUS FOR MOLDING MATERIALS
Filed July 21, 1930   6 Sheets-Sheet 6

INVENTORS
WILLIAM O. WITHERSPOON
JAMES HARROWER
BY Charles S. Evans
THEIR ATTORNEY Patented Oct. 25, 1932

1,884,948

UNITED STATES PATENT OFFICE

WILLIAM O. WITHERSPOON, OF BURLINGAME, AND JAMES HARROWER, OF SAN FRANCISCO, CALIFORNIA, ASSIGNORS TO J. D. & A. B. SPRECKELS INVESTMENT COMPANY, A CORPORATION OF CALIFORNIA

APPARATUS FOR MOLDING MATERIALS

Application filed July 21, 1930. Serial No. 469,572.

Our invention relates to automatic molding, and particularly to a machine and method for making slabs of sugar from granulated sugar.

An object of our invention is the provision of a machine that will mold and cement granular material together into an integral body of a given form.

A further particular object is the provision of a machine and method for making slabs or cube sugar from granulated sugar.

A further object of our invention is the provision of a machine, of the character described, which is capable of handling a plurality of molds simultaneously and in a continuous cycle; so as to occupy a minimum space.

The invention possesses numerous other objects and features of advantage, some of which, with the foregoing, will be set forth in the following description of our invention. It is to be understood that we do not limit ourselves to this disclosure of species of our invention, as we may adopt variant embodiments thereof within the scope of the claims.

Referring to the drawings.

In terms of broad inclusion the machine of our invention comprises a movable table upon which a number of molds are mounted. Predetermined amounts of granulated sugar are fed successively into these molds by an automatic weighing device as the molds move about with the table. Before passing into the weighing device the sugar is preheated in a heat exchanger to a temperature of approximately 190° F. which is well below the carmelizing point, to prevent a too rapid crystallization during the syruping and drying operations which follow.

After receiving its charge of heated sugar the mold passes under a cap which descends upon it and provides a tight connection through which a certain amount of sugar syrup is added and forced throughout the interstices between the sugar granules by a following blast of heated compressed air, which drives the surplus syrup on through the sugar in the mold.

The mold then moves on and is connected to a low pressure or vacuum manifold which is mounted subjacent the table; and a current of air is thus drawn through the sugar during a large part of its remaining journey around the table. This blast of air serves to draw any remaining uncombined parts of the syrup from the sugar, and to dry the slab so that it will preserve its form when removed from the mold.

When the sugar slab is thus sufficiently dried the mold is opened and the slab removed manually, after which the mold is cleansed by means of live steam and dried by a blast of hot air. It then passes on to receive a fresh charge of sugar and the operation is repeated.

In order to allow sufficient time for the various operations to be completed the table is preferably moved intermittently a step at a time. Such driving means is provided for the table, and also timing gear which automatically controls the operations of the various valves and mechanical movements correlated with the above described operation of the machine.

The preferred embodiment of our invention shown herein is a machine used for making relatively large slabs of sugar which are later sawed into small cubes for table use. We do not limit ourselves to the size of the slab as the machine can be used to form smaller slabs which may be used without having to be sawed. However, because of the superior appearance of the sawed cubes we prefer, at the present time, to construct the machine as shown.

The machine can also be used advantageously in forming products other than slab sugar. As examples of other such products to be made by the machine we might mention first, a filtering material made by passing a solution of cement through coarse sand; and second, an acoustic material made by passing a solution of glue or cementitious material through coarse sawdust or similar material.

Since these processes are somewhat simpler than the sugar slabbing process we have elected to describe the machine in conjunction with the latter, but do not limit ourselves to such use. Similarly it is obvious that if other operations were desirable they could be readily provided for by adding further mechanisms to the machine according to the methods set forth herein.

Figure 10:
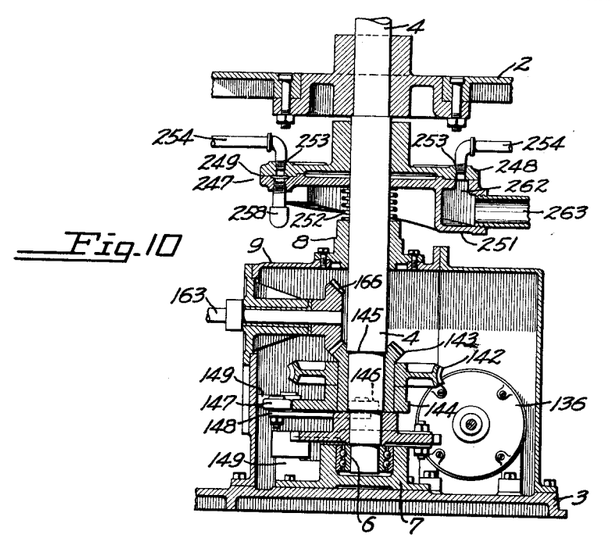
Figure 10 is a fragmentary sectional elevation of the lower portion of the machine taken along the vertical spindle. The plane of section is indicated by the line 10—10 on Figure 3.

In terms of greater detail the machine of our invention comprises a circular table 2, rotatably supported on a base 3 by a spindle 4. As can be seen in Figure 10 the spindle is supported at the bottom by a suitable thrust bearing 6 which is held in a flanged socket 7 fixed to the base. The spindle is maintained in its vertical position by means of a bearing 8 which is fixed on the top of a gear housing 9, in turn rigidly mounted on the base. The periphery of the table is further supported by means of the circumferentially disposed rollers 11, which bear against a suitable smooth path provided on the under side of the table. These rollers are journaled in the posts 12 which are fixed on the base, and the adjacent floor.

Figure 1:
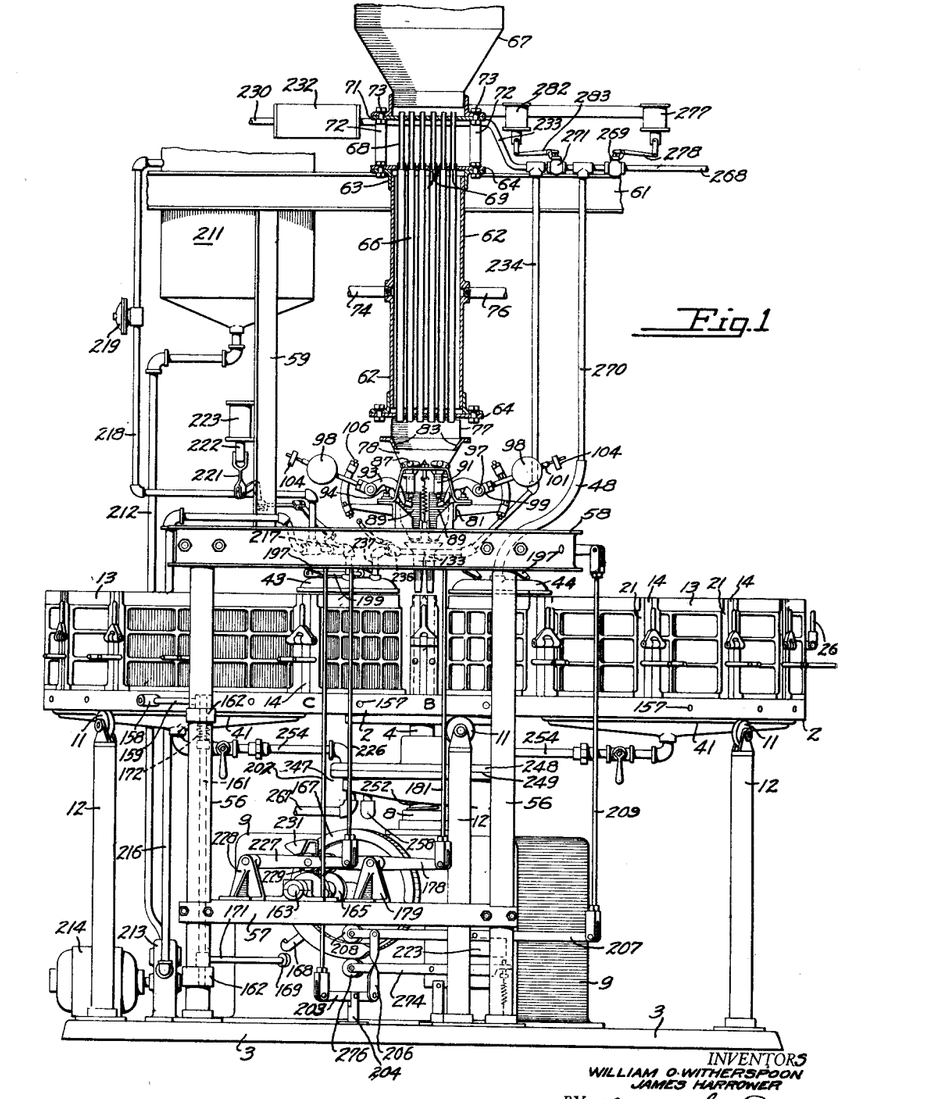
Figure 1 is a partially diagrammatic, partially sectionalized elevation of a machine in which the duplication of certain like parts is avoided for the sake of clarity.
Figure 4:
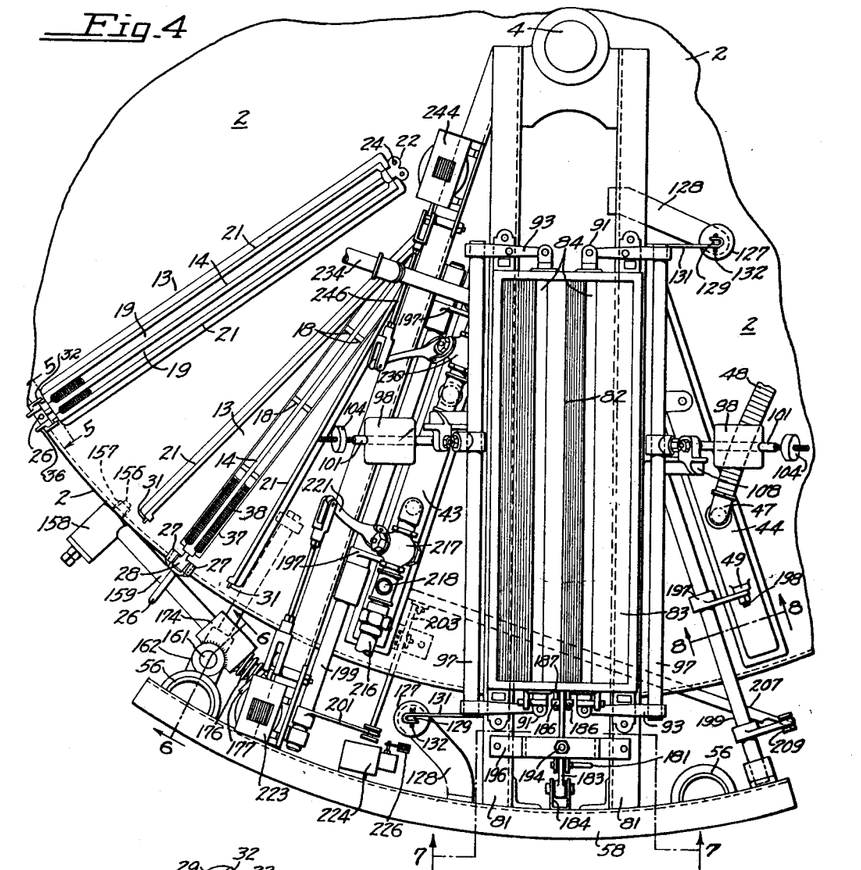
Figure 4 is a fragmentary plan view of the charging apparatus and table top.
Figures 8, 9:
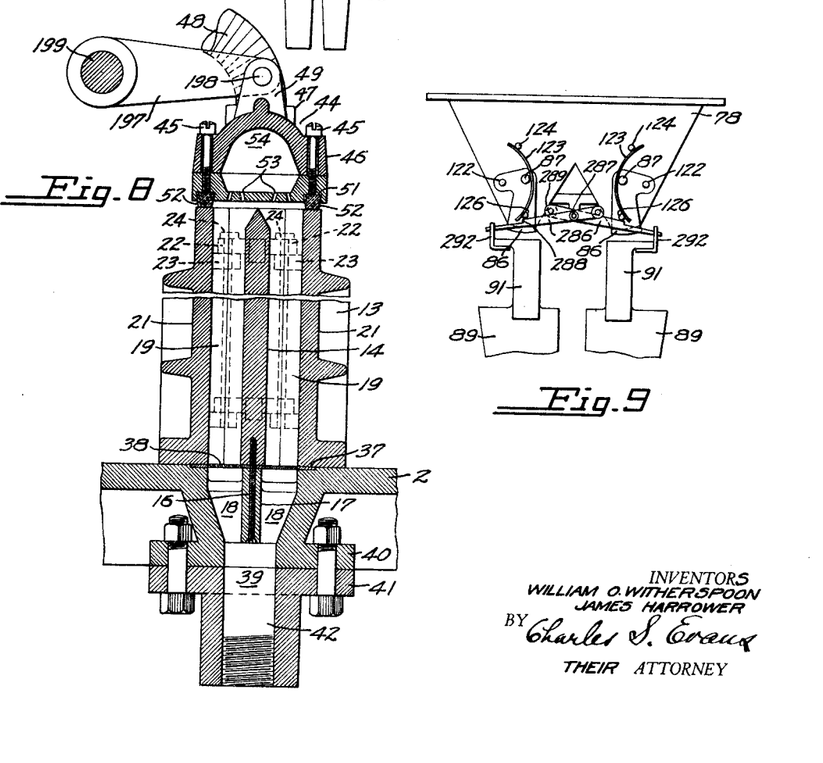
Figure 8 is a transverse sectional elevation of a mold having the steam charging cap in place. The plane of section is indicated by the line 8—8 of Figure 4.
Figure 9 is an end elevation of an alternative form of the gate actuating means of the charging device shown in Figure 7.

The molds 13, in which the slabs are formed, are radially disposed about the outer portion of the table top as shown in Figures 1 and 4. Referring now to Figure 8, each mold has a central partition 14, which is fastened by the screws 16 to a companion sub-partition 17, which is preferably formed integrally with the table top 2 and supported by two or more pairs of webs 18 located at suitable intervals along its length.

The slab molding chambers 19 are formed on either side of the partition 14 by the side walls 21, which are hinged on the inner end of the partition wall by means of the lugs 22 on the partition, the lugs 23 on the side walls, and the pins 24 inserted in holes drilled in the various lugs. The side walls can thus be swung outward as shown in Figure 4 to permit the removal of the slabs after they are formed.

Figure 5:
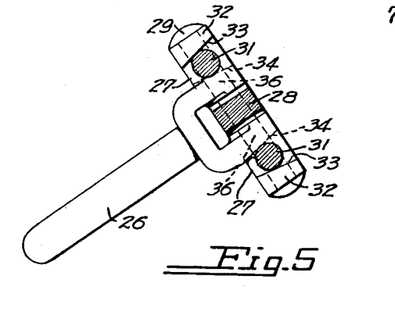
Figure 5 is a sectional view of the mold locking device. The plane of section is indicated by the line 5—5 of Figure 4.

The molds are held together by the locking mechanism shown in Figures 4 and 5. This device is operated by means of a handle 26 which is preferably joined integrally to the two bosses 27. The handle is pivotally mounted on a lug 28 fixed to the partition 14, by means of a pin 29 which is inserted in holes drilled through the bosses 27 and the lug 28. Each mold wall has a pin 31 fixed therein, in a position to be engaged by wedges fixed on the bosses 27. These wedges are arranged in pairs on opposite sides of the bosses substantially at right angles to the handle.

The pair of wedges 32 have the inclined faces 33 which engage the pins 31 and press the mold walls together when the handle is turned up. When the handle is swung down the pins 31 are engaged on their inner sides by the inclined faces 34 of the oppositely disposed pair of wedges 36, and the pins and hence the mold walls are thus broken apart so that they may be swung open.

In order to retain granulated material in the mold and at the same time permit the flow of fluids downward through the mold, the bottom is formed of a perforated strainer or screen. In the preferred form shown this screen comprises a brass plate 37, which rests in a suitable recess provided in the table top, and which has the perforations 38 in the portions of the plate beneath the chambers 19. For ordinary granulated sugar, four hundred perforations, twenty seven thousandths of an inch in diameter, per square inch of plate surface, function in the desired manner, since the sugar is retained while syrup and air can pass through.

The table beneath each of the molds is provided with an elongated aperture divided by the sub-partition 17. This aperture tapers into the circular duct 39 about which a flange 40 offers means for connecting a flanged member 41. The member 41 has a duct 42 therein which is tapped to receive a pipe leading to the external connection. It is through this connection that the excess syrup, air, or other fluids pass from the mold.

Such fluids are guided into the mold by means of the caps 43 and 44, which may be lowered down on top of the mold. As a matter of convenience in manufacture these caps are made in two parts held together by the screws 45. An upper portion 46 embodies a suitable connection 47 for a flexible feeding hose 48, and the supporting lugs 49. The lower portion embodies the grooves 51 in which a packing ring 52 is held to form a liquid tight joint with the mold. It also embodies the perforations 53 which serve to distribute the fluids over the surface within the mold. In cap 44 these perforations are made quite small for steam and gases, but are preferably enlarged materially in cap 43 where they must pass syrup or other viscous liquids. The combined portions of each cap form the duct 54 which distributes the fluids from the feeding hose to the various perforations.

The caps as well as the supply and control mechanism are supported on a super-structure which comprises the posts 56 fixed to the base and supporting the cross members 57 and 58, and the posts 59 which in turn support the cross members 61.

As each mold arrives at the loading station it is filled first with the granulated material, which is sugar in this particular case, and then, at subsequent stations, with the cementing and drying materials, by means of apparatus which will now be described.

It is desirable that the sugar be heated before passing into the molds and a heat exchanger is accordingly provided to accomplish this result.

Referring now to Figure 1, the exterior shell 62 of the exchanger is supported on the cross member 61 by a flange 63. The end plates 64 are bolted to the shell to support the tubes 66 through which the sugar passes. The sugar enters the heat exchanger from the supply hopper 67 through a second set of tubes 68, which form slip joints 69, with the tubes 66, and which are supported by a cover plate 71 held on the plate 64 by means of the spacer columns held on the plate 64 by means of the spacer columns 72 and through bolts 73. The hopper 67 also rests on the plate 71, but provision is preferably made for lifting the hopper clear so that the cover plate 71 and tubes 68 may be removed to permit the scraping out of all tubes as occasion demands.

Steam is circulated through the shell and about the tubes 66, to heat the sugar, through the pipes 74 and 76.

The flow of steam is preferably automatically regulated to bring the sugar to a temperature of approximately 190° F. by suitable means, such as a thermostatic element in contact with the sugar as it leaves the exchanger, controlling a throttling valve in the steam supply line. This latter equipment is omitted from the drawings for the sake of clarity as is the heat insulating material about the heat exchanger; and also a strainer in the top of the hopper.

After leaving the heat exchanger the sugar passes into a second hopper 77 which is loosely engaged with the bottom of the heat exchanger to permit temperative expansion of the latter. The friction caused by the back pressure of the sugar in the hopper is sufficient to prevent the sugar from overflowing.

Figure 7:
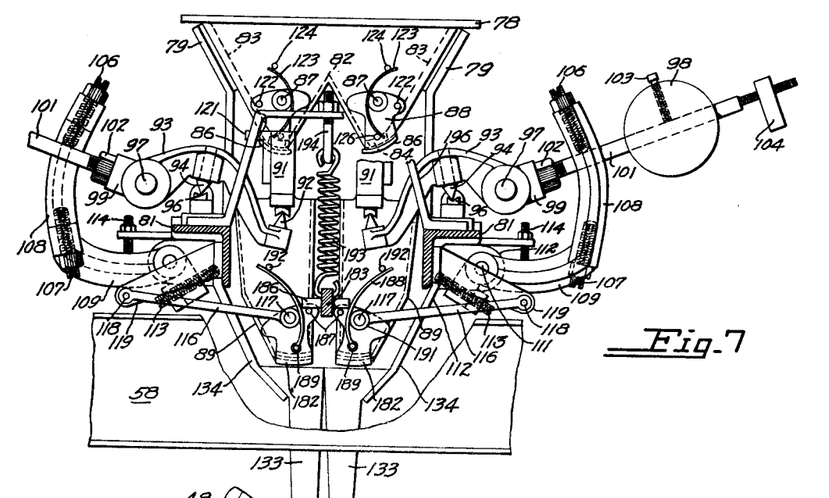
Figure 7 is a sectional elevation of the charging device. The plane of section is indicated by the line 7—7 of Figure 4.

Referring now to Figure 7, a lower portion 78 of the lower hopper is supported by the brackets 79 which in turn are mounted on a framework 81 fixed on the cross members 58. The sugar is divided into two paths by means of an angular partition 82 down the center of the hopper. This partition together with the inwardly sloping sides 83 form two long slots 84 in the bottom of the hopper through which the sugar may flow out. The flow of the sugar from the hopper is controlled by means of the two arcuate shaped gates 86 which are pivotally supported on the pins 87 by the brackets 88.

After dropping through the gates 86 the sugar is caught in two balanced receptacles 89 which are in effect the tray of an automatic weighing scale. The receptacles are movably supported on knife edges so that they may rise and fall. There are a pair of lugs 91 fixed on opposite ends of each receptacle and resting upon the knife edges 92. The latter are fixed on the pairs of arms 93 which are balanced on the knife edges 94 resting in suitable grooves 96 fixed on the frame 81. The pairs of arms at opposite ends of the receptacle are joined at their outer ends by the rods 97. Balancing weights 98 are fixed to the center of these rods, on the bosses 99, which are held on the rods by the clamping action of the arms contacting with the rods 97. Lock nuts 102 prevent this assembly from working loose. The weights 98 may be moved along the arms 101 to obtain the desired weight adjustment, and are held in their adjusted position by the set screws 103. Final adjustment of the balance is obtained by the eccentrically mounted weights 104, threaded on the ends of the arms 101, and which remain in their adjusted position because of their eccentric weight distribution.

Movement of the arms 101 and hence of the receptacles is limited by the set screws 106 and 107, which are threaded into the arcuate arms 108 of the brackets 109. These brackets are pivotally mounted on the pins 111 in the brackets 112, which are fixed on the frame 81. The position of the bracket 109 is adjusted and held by the inter-action of set screws 113 and 114 with their associated lock nuts. The bottom of each receptacle is guided by a link 116 which engages a pin 117 on the receptacle and a pin 118 fixed in an extension 119 of the bracket 112.

When the receptacles 89 are empty, they are swung upward by the action of the weights 98 and the inter-connecting linkages until the lugs 121 fixed on the lugs 91 engage the pins 122, which project from the brackets 88. This opens the gates 86 and permits sugar to flow from the hopper 78 into the receptacles 89. Sugar will continue to flow until the weight of sugar in the receptacles counter-balances the weights 98 and the receptacles begin to sink. As the pressure on the pins 122 is thus relieved the springs 123, which are held at one end by the pins 124 on the hopper, and at the other to pins 126 on the gates, pull the gates 86 closed and the flow of sugar is shut off.

The object of using this measuring device is to obtain the delivery of an approximately constant volume of sugar to the molds. For a given range and locus of travel the receptacles will deliver an approximately constant weight of sugar, so that if the ambient atmosphere is excessively humid the specific gravity of the sugar will be increased, and the resulting volume of sugar delivered will be diminished. It is to correct for this variation of specific gravity that the adjustable bracket 109 is provided. The amount of sugar that will flow during an operation of the gates is determined by the length of time the gates are open. By lowering the brackets 109 as a unit or by lowering set screw 107, the receptacles may be caused to rise higher and thus hold the gates 86 open longer and receive more sugar which will counteract the effect of an increase of density on the volume delivered. Reverse adjustment will obviously have an opposite effect. It is thus seen that means are provided for readily bringing a new machine into adjustment and maintaining it in adjustment for various sugar densities.

To prevent shocks being imposed upon the knife edges by too rapid operation of the mechanism, motion of the receptacles is retarded by dash pots. This construction is shown in Figure 4 in which the dash pots 127 are fixed on the frame of the machine by the brackets 128. Piston rods 129 of the dash pots are attached to the rods 97 by the links 131; rigidly fixed on the rods 97 and slotted to receive the pins 132, fixed in the piston rods; the slots being made sufficiently long to allow for the transverse motion of the rods 97 due to their arcuate travel. These dash pots are omitted from the other views for the sake of clarity.

Receptacles 89 discharge their load of sugar into the molds through the twin funnels 133, supported from the frame 81 by the extensions 134 of the brackets 112.

In order to have the sugar discharge into a mold, it is necessary that the discharge be timed in relation to the rotation of the table and hence of the mold, and that the table move intermittently a step at a time in order to have the successive molds under the funnels and other feeding devices long enough for the various operations to take place.

Figure 2:
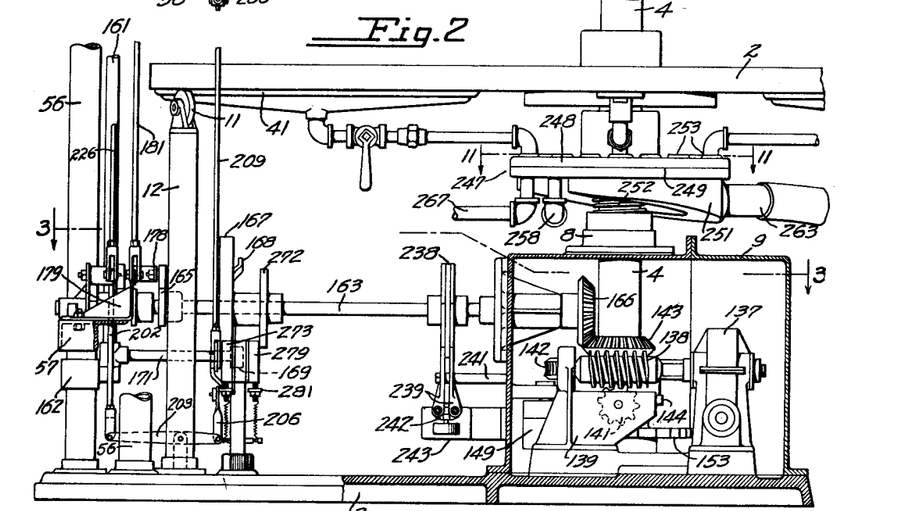
Figure 2 is an elevation of the bottom portion of the machine in which certain parts are cut away to better show the internal construction.

This result is accomplished by a driving and timing mechanism that will now be described. Power is supplied to the machine by a suitable prime mover such as the motor 136, shown in Figures 3 and 10. The motor drives any suitable type of speed changing device 137, which in turn supplies power to a worm pinion 138. As can be seen in Figure 2, this pinion is journaled in a gear box 139, which is fixed on the base 3 of the machine, and is lubricated by an idler gear 141, which dips down into an oil bath maintained in the gear box.

The worm pinion drives a worm gear 142, fixed to a bevel gear 143 and a cam 144, all of which are journaled for rotation about the spindle 4. This construction can best be understood by referring to Figure 10, in which view it can be seen that the rotating assembly just described is restrained axially at the top by a shoulder 145 engaging the gear 143; and at the bottom by pressing against the subjacent members on the spindle.

Intermittent rotary motion is applied to the spindle 4 and consequently to the table, through the medium of the cam 144 which actuates the cam followers 146 and 147. These followers, which are preferably rollers as shown, are mounted on the ends of a rocker arm 148, journaled in a boss 149 provided on the socket member 7.

Figure 3:
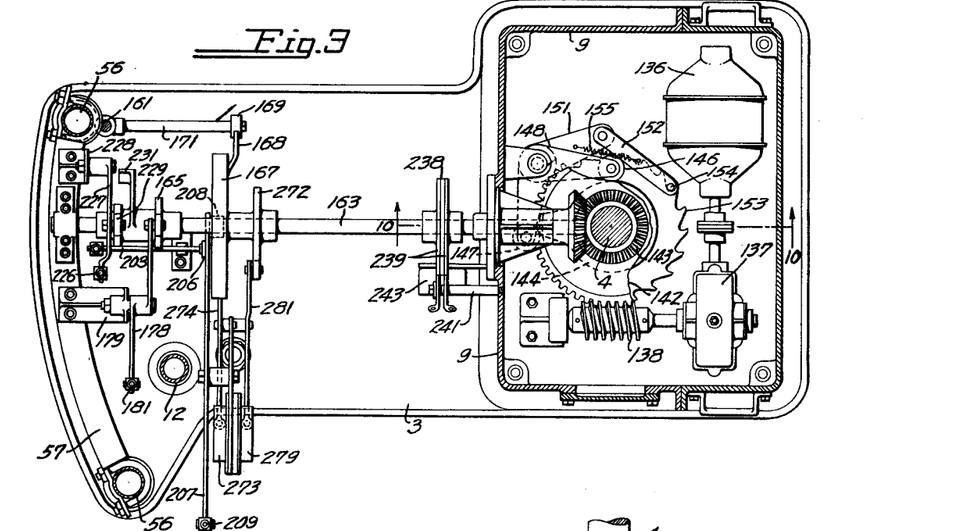
Figure 3 is a partially sectionalized plan view of the lower portion of the machine as it is shown in Figure 2. The plane along which this view is taken is indicated by the line 3—3 of Figure 2.

As shown in Figure 3, a third arm 151, preferably formed integrally with the rocker, provides a pivotal connection for a link 152 which transmits the force from the rocker arm to a notched wheel 153 by means of a pin 154. The notched wheel 153 is keyed to the spindle 4; so that as the cam presses out the follower 147, the link 152 turns the notched wheel and hence the table through one step. When the follower 146 is pressed out, link 152 is retracted and the pin 154 is pulled into the following notch by the action of a spring 155, which has its two ends fixed respectively on the rocker 148 and the link 152.

The notched wheel is so disposed with respect to the molds and the funnels 133, as to bring a mold under the funnels at each step of the table rotation. To be doubly sure that the molds will not move too far because of the inertia of the moving parts, a spring pressed stop is provided to restrain the table in position during its periods of rest.

This stop comprises a spring pressed tapered pin 156 which engages the notches 157 formed about the periphery of the table, at suitable intervals as indicated in Figures 1 and 4. The pin is slidably mounted in a socket 158 fixed on an arm 159 which is held on a shaft 161, rotatably mounted in the brackets 162 fixed on a post 56.

The stop is mechanically operated to perform its function in proper time relationship with the other operations, in a manner now to be described along with the other timing mechanism. Referring to Figures 2 and 3, a timing gear shaft 163 is journaled in the gear housing 9 and on a cross beam 57 fixed between two of the posts 56. This shaft is driven by a bevel gear 166 which is operatively engaged with the gear 143; and since this latter gear is fixed for rotation with the cam 144, the rotation of the timing gear shaft will have a fixed relation to the rotation of the table.

Figure 6:
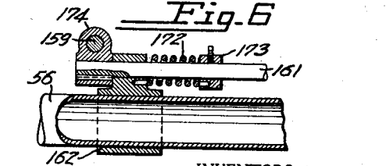
Figure 6 is a sectional view of the stop pin supporting bracket. The plane of section is indicated by the line 6—6 of Figure 4.

A cam 167 is fixed on the shaft 163 and a projecting arm 168 is fixed on the cam. The timing is arranged so that just before the table is to move, arm 168 strikes a roller 169 which is mounted on the end of an arm 171, fixed on the shaft 161. This swings out the arm 159 and releases the pin 156 from the notch 157 in which it is inserted. As soon as arm 168 releases the roller, the socket 158 and stop pin 156 are pressed up against the rim of the table by action of a spring 172, shown in Figure 6, which has one end fixed in a bracket 162 and the other end fixed in a collar 173, held on the shaft 161. The spring pressed stop pin will then slip into the next notch that comes along and the table will again be stopped.

In order to prevent a damaging shock to the mechanism when the pin suddenly engages a notch, shock absorbing means is provided between the arm 159 and the post. This is accomplished, as shown in Figure 4, by having the arm 159 slidably held in a bracket 174, and restrained by a spring 176 interposed between the bracket and a collar 177 fixed on the end of the shaft. The bracket and spring thus form a resilient connection between the arm 159 and the shaft 161, and will absorb the shocks that otherwise would be imposed on the mechanism.

From the above description it is seen that the molds will be successively stopped under the funnels; and that the receptacles 89 will be filled with the proper amount of sugar. When the molds are thus stopped, the sugar is dumped from the receptacle through the medium of the cam 165 which actuates a rocker arm 178, pivotally mounted on the cross member 57, in a bracket 179. This rocker arm pulls down on a reach rod 181 attached to its outer end, and supplies the force for dumping the sugar from the receptacles into the molds in spaced time relationship to the movement of the molds in the following manner.

Gates 182 are pivotally attached to the receptacles 89 by the pins 117. The gates are opened and the sugar runs forth when the rod 181, pulls down on a lever 183 which is pivotally attached to the cross member 58 at one end by a bracket 184 and which has the projecting lugs 186 on the other end in contact with pins 187 fixed in the gates 182.

It is evident, from Figure 7, that as the pins 187 are pressed down the gates 182 will be opened. When the downward pressure is released, the gates will be closed by the retractive action of the cantilever springs 188, which are pivotally held on the pins 189 fixed in the gates, and which are bent around the bosses 191 on the ends of the links 116, and lodged against the pins 192 fixed in the receptacles.

In order that the weight of the lever 183 and its connecting mechanism back to the cam 165 will not disturb the gravity balance of the receptacles, it is desirable that the lugs 186 be raised above the highest point of movement of the pins 187 between the tripping or unloading operations. This is accomplished by a spring 193 hooked into the lever 183 and supported at its upper end by the adjustable pin 194, which is mounted in a bracket 196 fixed to the frame 81.

As the table is rotated each succeeding mold will receive a measured charge of sugar as it arrives at the loading station beneath the funnels. As the molds pass on it is desired that syrup be added and that the excess syrup be removed and the remaining material in the mold dried until it forms an integral body. The mechanism which accomplishes these results will now be described.

Referring now to Figure 1, after receiving a charge of sugar at station B, the mold moves on to station C where it receives a charge of syrup. The detailed description of the construction of cap 43 through which the syrup is discharged into the mold was given when the mold was described. As was intimated at that time the cap 43 is pivotally mounted on the frame 81. This mechanism comprises the arms 197 which engage the pins 198 in the lugs 49, and which are fixed on the shaft 199 journaled on the frame 81. The cap is raised or lowered when this shaft is turned by a lever 201, fixed at a convenient point on the shaft and operatively engaged with the cam 167, by a reach rod 202 and a rocker arm 203. This arm is pivotally mounted on the base 3 in a bracket 204, and engages the cam through an intervening link 206, a rocker arm 207 and a roller 208, pivotally mounted thereon.

Cleansing cap 44 is raised and lowered in a manner similar to that of the syrup cap 43, hence the mechanism for doing this is described. The rocker arm 207 operates the cleansing cap 44 through a rod 209 and a link and lever mechanism similar to that described for the syrup cap 43. The cleansing cap functions to inject substances to cleanse and dry the molds preparatory to receiving a fresh charge of sugar. The detailed description of its operation will be given later in its proper order.

As was previously described, after a mold receives its charge of sugar, it stops at the next station under the syrup cap 43 which descends and fits tightly onto the top of the mold at the proper instant. It is now necessary to describe the mechanism that injects a charge of syrup into the mold and forces it through the interstices between the sugar granules in spaced time relationship to the movement of the molds.

As shown in Figure 1, the saturated heated sugar syrup is stored in a container 211 supported on the cross member 61. The mechanism for mixing and heating the syrup will be described later. A pipe 212 leads the syrup from the container to a pressure pump 213, driven by a motor 214, both mounted on the base 3. A second pipe 216 leads the syrup from the pressure side of the pump to a solenoid controlled valve 217, from which the flexible hose 48 leads the syrup into the cap as previously described.

In order to maintain a substantially constant syrup pressure on the solenoid valve, a third pipe 218 is connected between the top of the container and a point on the pipe 216 between the pump and the valve; and a pressure regulating valve 219, of any suitable type, is installed in the pipe 218 to bleed back a portion of the pump discharge to the container and thus regulate the pressure, in the customary manner.

The valve 217 is operated through a connected system of levers 221 by the plunger 222 of a solenoid 223. Electric current is supplied from any suitable outside source to the solenoid at the proper intervals by a toggle switch 224. This switch is mounted on the cross member 58 and is actuated by a reach rod 226, which extends from the toggle arm of the switch to the end of rocker arm 227, pivotally mounted in a bracket 228 on the cross member 57. A roller 229 on the arm 227 makes contact with double cam 231 on the shaft 163, which alternately opens and closes switch 224 and consequently valve 217, and thus controls the flow of syrup into the mold. The time the valve 217 will remain open is fixed by the dimensions of the cam 231, but the quantity of syrup that will pass can be regulated by adjusting the pressure regulator valve 219. Thus a substantially uniform charge of syrup can be injected into each mold as it passes through that stage of the operation.

The syrup is fairly viscous and would flow into the sugar very slowly if actuated only by its own weight. In order to speed up this flow and to remove the excess syrup from the sugar, the flow of the syrup through the cap is followed immediately by a blast of hot compressed air which blows the excess syrup through the sugar and out through the perforations 38 in the bottom of the mold.

This air is supplied to the machine from any suitable outside source through a pipe 230, and is heated by a heater 232, which may be of any suitable type, from which it passes into the mold through the pipes 233 and 234, solenoid valve 236, and a flexible hose 237. The blast of hot air is suitably timed to follow the syrup into the mold, by means of a double cam 238, on the shaft 163, which operates the levers 239 pivotally mounted on an arm 241 fixed to the gear box 9. These levers operate a toggle arm 242 of an electric switch 243, and thus control the flow of electric current from an outside source to a solenoid 244. Solenoid 244 in turn opens and closes the valve 236, through a connected system of levers 246, and thus controls the flow of hot air into the mold.

From the preceding description, it is seen that the discharge of syrup and air through cap 43 are timed to function while the mold is at rest and ready to receive these materials.

After receiving the syrup and blast of hot air, the mold then passes on to the next station, where a vacuum is impressed on the perforations thus drawing a blast of air through the mold to remove the excess water from the sugar crystals and cement the sugar into an integral body or slab.

In order to effect a tight connection to the bottoms of the molds, a manifold 247 is provided about the spindle 4, subjacent the table. As best shown in Figure 10, this manifold has an upper portion 248 keyed on the spindle 4 and fixed for rotation with the table, and forming a tight sliding joint 249 with a stationary lower portion 251, which is pressed against the upper portion by a spring 252 interposed between the lower portion and the bearing 8. For convenience in assembly the manifold portions are split transversely and held together by the bolts 250 to permit them being installed about the spindle 4. The upper portion 248 is tapped at a plurality of points 253 about its periphery to provide connections for the pipes 254, which lead to the holes 42 communicating with the perforations in the bottoms of the molds.

Figure 11:
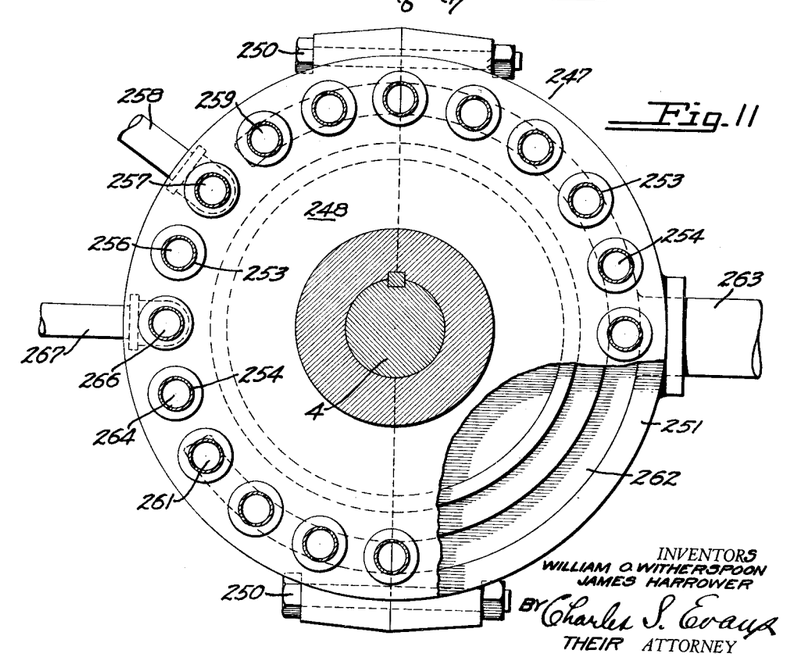
Figure 11 is a detail plan view of the exhaust manifold. The plane along which this view is taken is indicated by the line 11—11 of Figure 2.

The machine selected for illustration and described herein has twenty molds on the table; and the upper portion of the manifold accordingly has twenty connections as shown in Figure 11. As previously described, the table stops at twenty stations corresponding to the number of molds. At the station numbered 256 on Figure 11, which corresponds to station B previously mentioned the sugar is being loaded into the mold; and at that point a flat spot on the lower portion of the manifold seals the connection in the upper portion.

At the station numbered 257, which corresponds to station C previously mentioned, the syrup is injected into the mold; and a pipe 258 is provided in the lower portion of the manifold to lead the excess syrup to a suitable catch basin, not shown in the drawings, and to permit the escape of the following blast of hot air. Beginning at the next station numbered 259 and thence on around to the station numbered 261, the perforations are connected with a single chamber 262 in which a vacuum is maintained by a suitable pump, such as a fluid jet eductor, connected to the pipe 263. This serves to draw air in through the top of the mold and out through the perforations to dry the material in the mold, until it is thoroughly cemented together by the interlocking of the granulated sugar, with the sugar crystals, precipitated from the saturated syrup. At the station numbered 264, which again has the connection sealed by a flat spot on the lower manifold, an operator opens the mold in the manner previously described, and removes the sugar slabs manually in order not to break them. For stronger materials such as the filtering material or acoustic material previously mentioned, a device could be added to remove the finished material from the molds automatically, but for sugar slabs it is preferable to have an attendant, who will usually be present in any event, remove the slabs by hand.

At the station numbered 266 the now empty and closed mold is cleansed and dried by a blast of steam followed by a blast of hot dry air; and a pipe 267 is provided to lead these substances away from the machine. The steam and air for cleansing the mold are injected through the cap 44 which is raised and lowered in a manner previously described.

Steam is supplied to the cleansing cap 44 from a suitable outside source through a pipe 268, and its flow is controlled by a solenoid operated valve 269, from which it passes through a pipe 270 and flexible hose 48 into the cap. The hot air is supplied through the heater 232 and its flow is controlled by a solenoid operated valve 271, from which it passes through the pipe 270 and flexible hose 48 into the cap. The opening and closing of these valves are timed respectively by the cams 167 and 272, which are mounted on the timing gear shaft 163. A switch 273 is mounted on the frame of the machine, and is actuated by a rocker arm 274 pivotally mounted on the frame and having a roller 276 engaging the cam 167. This switch controls the flow of current from a suitable outside source to a solenoid 277, which operates the steam valve 269 through a lever mechanism 278.

Immediately following this blast of steam, the air valve is opened through the medium of the cam 272 which actuates a switch 279 through a rocker arm 281. This switch controls the flow of electric current to a solenoid 282 which operates the valve 271 through a lever mechanism 283.

A mold after being cleansed passes on to the sugar loading station and the cycle is repeated.

An alternative form of sugar feeding device for the receptacles 89 is shown in Figure 9, which gives a somewhat closer regulation than the device previously described. The gates 86 are arranged on the hopper 78 and are opened by the lugs 91 engaging the pins 122 as before, but a more definite cut off point is obtained by having the gates closed by the downward movement of the receptacles through a quick acting mechanism.

This is accomplished by providing the levers 286 pivotally mounted on a pin 287 fixed on the hopper 78. These levers have a shoulder 288 on their outer portions disposed to engage the pins 126 on the gates to hold them open. The levers are counter-balanced by the weights 289 to insure that the extending ends 291 of the levers will remain in contact with the pins 126, when the gates are open. As the receptacles descend the shoulders will hold the gates open until the hooks 292 pull down on the ends of the levers and release the shoulders from the pins 126 which permits the springs 123 to snap the gates shut.

Figures 12, 13:
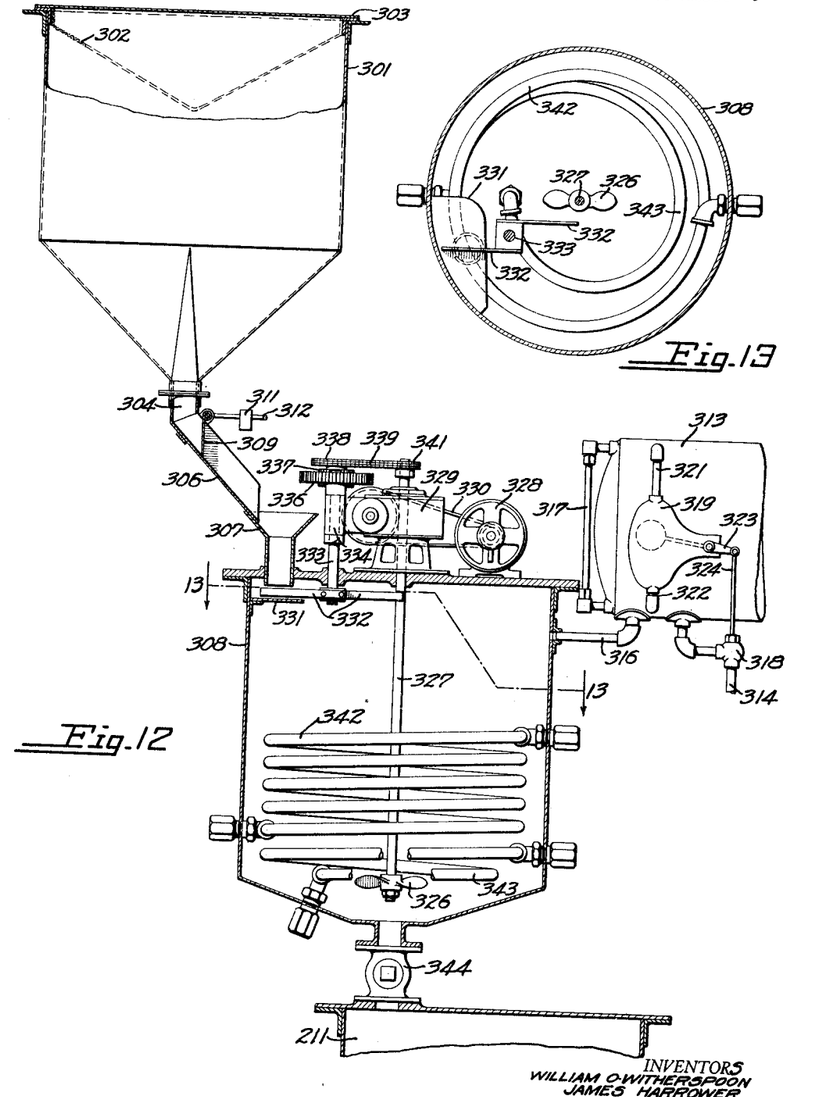
Figure 12 is a sectional elevation of the syrup mixing and heating mechanism.
Figure 13 is a transverse section taken through the mixing tank. The plane of section is indicated by the line 13—13 of Figure 12.

The device for mixing and heating the sugar syrup is shown in Figures 12 and 13. This mechanism may be supported on any suitable superstructure that will maintain it at a suitable level about the machine. Its approximate relative position with respect to the rest of the machine may be seen by noting that the top of container 211 which appears in Figure 1, also appears at the bottom of the mechanism shown in Figure 12.

The granulated sugar is introduced into a hopper 301 through a screen 302; and a cover 303 is provided to keep foreign material out of the hopper. The sugar runs out through a duct 304 in the bottom of the hopper, into a chute 306 which guides the sugar into a funnel 307 on a mixing tank 308. Flow of sugar from the hopper is regulated by a pivotally mounted gate 309, which is maintained in an approximately constant position by an eccentric weight 311 threaded on a lever 312, fixed on the gate at approximately a right angle, so that it will partially counter-balance the pressure of the sugar against the gate.

A position of the weight 311 is found to permit the sugar to pass from the hopper at a rate that will form the saturated sugar syrup solution as it is required.

Water is supplied to the mixing tank 308 in a somewhat similar manner by means of a measuring tank 313. Water is supplied to this tank from a suitable outside source through a pipe 314; and passes from the tank 313 through a pipe 316 into tank 308.

The flow of water is regulated to give the proper amount of syrup as it is needed, by maintaining the level of the water in tank 313 approximately constant, as can be observed on a water glass 317 suitably installed on the tank. This constant level is maintained by throttling a valve 318 in the supply line 314. This throttling may be accomplished automatically by a float actuated device 319 suitably connected to the tank by pipes 321 and 322, and controlling the valve 318 through the medium of the external lever 323 and reach rod 324.

The sugar solution in the tank 308 is agitated by a propeller 326 supported adjacent the bottom of the tank on a shaft 327, driven by a motor 328 through a suitable speed changing device 329 and belt 330.

In order to scatter the sugar over the top of the liquid within the tank so that it will dissolve more readily, a shelf 331 is provided, in a position to catch the sugar as it falls through the funnel 307. The rotating paddle arms 332 then strike the sugar and scatter it over the tank. Arms 332 are supported on a shaft 333, journaled in a bracket 334, fixed on the side of the speed changing device 329. Shaft 333 is driven by a gear 336 fixed thereon, and engaging a pinion 337 fixed for rotation with a pulley 338 and journaled in an extension of the bracket 334. Pulley 338 is driven by a belt 339, which derives its power from a pulley 341 mounted on an upper extension of the shaft 327.

The water entering tank 313 is preferably already heated to a temperature of say 150° F. The temperature of the syrup is further raised to a temperature of approximately 190° F. by a suitable heating device such as steam coil 342 which is inserted in tank 308. It is of course desirable to regulate the flow of steam in the coil 342 automatically, so as to maintain the desired temperature of the syrup in the tank. This is accomplished by circulating water slowly through a second coil 343 so that it will come to the temperature of the syrup, and then passing this heated water over a thermostatic element which controls a throttling valve in the pipe line supplying steam to the coil 342. These latter two elements may be of any suitable type and are not shown in the drawings.

From tank 308, the syrup passes through a connection 344 into tank 211, from which it is taken as required in the manner previously described.

This completes the description of the construction and operation of the preferred form of our invention when applied to the production of cube or slab sugar. It is believed that the changes that would need to be effected in the machine to render it suitable for producing analogous products will immediately suggest themselves to those skilled in the art, and so need not be mentioned here.

It is to be noted, however, that the machine is particularly advantageous in that it effects drying by means of a blast of drying substance and thus avoids the baking or equivalent step commonly used in the past.

Again referring to the sugar machine as an illustration, it is found that the machine and method of manufacture by which it functions, materially reduces the cost of producing cube sugar because it eliminates the oven or pan drying step, used in the past to drive the excess water from the crystals. The ovens, the great number of trays, and the necessary handling equipment represented a large investment; and the time involved and labor costs incident to the heat drying processes further contributed toward rendering such processes expensive and slow.

The machine and process of our invention manufactures cube, or slab sugar with much less equipment, requires less floor space and time, and fewer operators. These factors all contribute to lower manufacturing costs.

We claim:

1. A machine for producing an integral body from particles of material, comprising a mold having perforations therein and adapted to contain the material; means for intermittently moving the mold; means for introducing cementing fluid, and means for cleansing the mold while it is stationary; and means communicating with said perforations for effecting passage of drying fluid through the perforations.

2. A machine for producing an integral body from particles of material, comprising a mold adapted to contain the material; means for intermittently moving the mold; means for introducing cementing fluid, and means for cleansing the mold while it is stationary; and means communicating with said mold for effecting passage of drying fluid therethrough.

3. A machine for producing an integral slab from syrup and particles of sugar, comprising containers for the sugar and for the syrup, heating means adjacent the containers, a plurality of movable molds, means for intermittently passing sugar and the syrup successively into the molds, means operatively engageable with the molds for forcing the excess syrup from the sugar, means for passing drying gaseous material through the molds, and means for moving the molds and actuating the passing and forcing means in spaced time relationship.

4. A machine for producing an integral slab from syrup and particles of sugar, comprising containers for the sugar and for the syrup, heating means adjacent the containers, a plurality of movable molds having perforations therein, means for intermittently passing sugar and the syrup successively into the molds, means operatively engageable with the molds for forcing the excess syrup from the sugar, means for passing drying gaseous material through the molds, and means for moving the molds and actuating the passing and forcing means in spaced time relationship.

5. In a machine for producing an integral body from particles of material, a manifold having a stationary portion and a rotating portion with a sliding joint therebetween, a plurality of connections in the rotating portion, a chamber in the stationary portion adapted to mutually connect a number of the rotating connections to a single stationary duct, and means for connecting certain other of the rotating connections individually to stationary ducts.

6. In a machine for producing an integral body from particles of material, a manifold comprising a disk having a plurality of connections disposed adjacent its periphery, and means for supporting it fixed thereto; a second disk shaped member embodying a passageway disposed adjacent its periphery for engaging a certain member of the first named connections, and having an external connection therein; a sliding joint formed between the two disk members for permitting relative motion while maintaining a tight connection, portions of this sliding joint being formed to seal certain of the first named connections during a portion of their travel; and a plurality of other passageways disposed to individually engage certain of the first named connections.

7. In a machine for producing an integral body from particles of material, a hopper for the material, a heat exchanger mounted beneath the hopper for heating the material, a gate associated with the heat exchanger for controlling the flow of material therefrom, a vertically movable receptacle disposed to receive the heated material, balancing means for the receptacle and the material contained therein, means for emptying the receptacle, and means actuated by the movement of the receptacle for controlling the gate.

8. In a machine for producing an integral body from particles of material, a hopper for the material, a heat exchanger mounted beneath the hopper for heating the material, a gate associated with the heat exchanger for controlling the flow of material therefrom, a vertically movable receptacle disposed to receive the heated material, balancing means for the receptacle and the material contained therein, a plurality of movable molds, means for emptying the receptacle into a mold, and means actuated by the movement of the receptacle for controlling the gate.

In testimony whereof, we have hereunto set our hands.

WILLIAM O. WITHERSPOON.
JAMES HARROWER.